US009641107B2

(12) United States Patent
Enoki et al.

(10) Patent No.: US 9,641,107 B2
(45) Date of Patent: May 2, 2017

(54) MOTOR CONTROLLER FOR ELECTRIC VEHICLE

(71) Applicant: Mitsubishi Electric Corporation, Chiyoda-ku, Tokyo (JP)

(72) Inventors: Keiichi Enoki, Tokyo (JP); Masahiro Iezawa, Tokyo (JP); Nobuhide Mori, Tokyo (JP); Yasufumi Ogawa, Tokyo (JP); Hiroyuki Kobayashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 134 days.

(21) Appl. No.: 14/418,751

(22) PCT Filed: Oct. 15, 2012

(86) PCT No.: PCT/JP2012/076625
§ 371 (c)(1),
(2) Date: Jan. 30, 2015

(87) PCT Pub. No.: WO2014/061083
PCT Pub. Date: Apr. 24, 2014

(65) Prior Publication Data
US 2015/0180386 A1    Jun. 25, 2015

(51) Int. Cl.
*H02K 29/06* (2006.01)
*H02P 6/10* (2006.01)
*B60L 15/20* (2006.01)

(52) U.S. Cl.
CPC ............... *H02P 6/10* (2013.01); *B60L 15/20* (2013.01); *B60L 2240/12* (2013.01);
(Continued)

(58) Field of Classification Search
USPC ................. 318/400.23, 568.22, 632, 400.15
See application file for complete search history.

(56) References Cited

U.S. PATENT DOCUMENTS 5,469,215 A    11/1995  Nashiki
6,564,110 B1 *  5/2003  Makino .............. G05B 13/0265
                                                         318/116

(Continued)

FOREIGN PATENT DOCUMENTS

CN    101362428 A    2/2009
JP    07-46878 A     2/1995

(Continued)

OTHER PUBLICATIONS

Communication dated Nov. 4, 2015 from the Japanese Patent Office in counterpart application No. 2014-541834.

(Continued)

*Primary Examiner* — Jorge L Carrasquillo
(74) *Attorney, Agent, or Firm* — Sughrue Mion, PLLC; Richard C. Turner (57) ABSTRACT

A motor controller for an electric vehicle sufficiently reduces vibration components caused by torque ripples passing through a resonance frequency of a vehicle body. The motor controller includes motor torque setting means for generating a first torque command, based on vehicle information, rotation position detection means for detecting a rotation position of the motor, rotation speed calculation means for calculating a rotation speed from a rotation position signal, a high-pass filter that extracts an AC signal component of a rotation speed signal, and a resonance suppression gain circuit that outputs a resonance suppression signal. A signal in which the resonance suppression signal is added to or subtracted from the first torque command is used as a second torque command so as to perform drive control for the motor.

11 Claims, 7 Drawing Sheets

(52) U.S. Cl.
CPC ... *B60L 2240/421* (2013.01); *B60L 2240/423* (2013.01); *B60L 2270/145* (2013.01); *Y02T 10/644* (2013.01); *Y02T 10/645* (2013.01); *Y02T 10/72* (2013.01); *Y02T 10/7275* (2013.01)

(56) References Cited

U.S. PATENT DOCUMENTS

| | | | | |
|---|---|---|---|---|
| 6,975,086 | B1* | 12/2005 | Honda | G05B 5/01 |
| | | | | 8/135 |
| 2002/0190683 | A1* | 12/2002 | Karikomi | G05D 19/02 |
| | | | | 318/632 |
| 2009/0042688 | A1* | 2/2009 | Itou | B60L 11/18 |
| | | | | 477/3 |
| 2010/0244755 | A1 | 9/2010 | Kinugasa et al. | |
| 2010/0286870 | A1 | 11/2010 | Endo et al. | |
| 2011/0101899 | A1 | 5/2011 | Manabe | |
| 2012/0179332 | A1* | 7/2012 | Harima | F02D 41/1498 |
| | | | | 701/37 |
| 2013/0057191 | A1* | 3/2013 | Yoshiura | G05B 19/19 |
| | | | | 318/600 |

FOREIGN PATENT DOCUMENTS

| | | | |
|---|---|---|---|
| JP | 09-289800 | A | 11/1997 |
| JP | 09289800 | A * | 11/1997 |
| JP | 2000-125410 | A | 4/2000 |
| JP | 3242223 | B2 | 12/2001 |
| JP | 3508742 | B2 | 3/2004 |
| JP | 2005-247574 | A | 9/2005 |
| JP | 2008048545 | A * | 2/2008 |
| JP | 2008-211933 | A | 9/2008 |
| JP | 2009-044871 | A | 2/2009 |
| JP | 2011-120444 | A | 6/2011 |
| JP | 4787736 | B2 | 10/2011 |
| JP | 4835959 | B2 | 12/2011 |
| JP | 2012-110111 | A | 6/2012 |
| JP | 2012-200051 | A | 10/2012 |
| WO | 2009/096008 | A1 | 8/2009 |

OTHER PUBLICATIONS

Takaaki Karikomi et al., "Highly-responsive acceleration control for the newly developed EV," Society of Automotive Engineers of Japan, Annual Conference Proceedings No. 55-11, pp. 5-8.

International Search Report of PCT/JP2012/076625 dated Dec. 25, 2012.

Communication dated Mar. 30, 2016, from the State Intellectual Property Office of People's Republic of China in counterpart Application No. 201280076400.X.

* cited by examiner

MOTOR CONTROLLER FOR ELECTRIC VEHICLE

CROSS REFERENCE TO RELATED APPLICATIONS

This is a National Stage of International Application No. PCT/JP2012/076625 filed Oct. 15, 2012, the contents of which are incorporated herein by reference in its entirety.

TECHNICAL FIELD

The present invention relates to a motor controller that drives an electric vehicle, and particularly relates to those which suppress vibrations of the electric vehicle which are caused by a steep rise in motor torque or by torque ripples in a motor during creep.

BACKGROUND ART

A motor controller for an electric vehicle in the related art controls a motor current so that torque generated by a motor follows a torque command in response to an accelerator operation of a driver.

Furthermore, the motor controller for the electric vehicle suppresses vibrations which are generated by torque ripples generated in the motor during creep travelling of the vehicle being coincident with a resonance frequency of torsional vibrations of the vehicle, and vibrations generated by motor torque steeply rising during a sudden start of the vehicle. In this manner, it is required to provide a comfortable ride for the driver.

In the motor controller for the electric vehicle in the related art, various proposals have already been made in order to achieve the above-described object. For example, there is provided a method in which a first torque target value set based on various vehicle information items of a vehicle is input to a filter including characteristics corresponding to a model Gp(s) which inputs torque to the vehicle and has a transfer characteristic of a motor rotation speed so as to calculate a rotation speed estimation value of a motor. Then, a difference between the rotation speed estimation value of the motor and a rotation speed detection value detected by motor rotation speed detection means is calculated, and is input to a filter including a model H(s)/Gp(s) using a band-pass filter H(s) having the transfer characteristic in which a difference between a denominator order number and a numerator order number becomes equal to or greater than a difference between a denominator order number and a numerator order number in the above-described model Gp(s). In this manner, a second torque target value is calculated, and the second torque value is added to the first torque value so as to create a new motor torque command value (for example, refer to PTL 1).

In addition, there is an alternative method in which a speed variation of the motor is extracted by means of the fast Fourier transform so that a vibration frequency component selected based on the extraction result is fed back to a motor torque command, thereby suppressing tire shaft vibrations and motor shaft vibrations (for example, refer to PTL 2).

In addition, there is another method of reducing vibrations by suppressing torque ripples of the motor. In this method, a table relating to amplitude and a phase of the torque ripples corresponding to the torque generated by the motor is created, and a ripple compensation value corresponding to a torque command value is calculated so as to suppress the amplitude and the phase of the torque ripples with reference to the table. In this manner, the motor shaft vibrations generated by the torque ripples are suppressed (for example, refer to PTL 3 and PTL 4).

As still another method, when a rotary electric machine is used as a drive source of the vehicle, for example, in some cases, the torque ripples having different characteristics are generated due to variations in the characteristics of mount rubber of a support unit for supporting the rotary electric machine in a vehicle body, or a structure of a drive transmission system from the rotary electric machine to wheels. In this case, since the generated torque ripples are different between a forward movement and a rearward movement of the vehicle, there is provided a positive/negative determination unit which determines positive or negative output torque of the rotary electric machine. In this manner, the vibrations of the vehicle are suppressed by generating a ripple correction wave having different phases corresponding to the positive or negative output torque, and by performing proper ripple correction corresponding to the generated torque ripples (refer to PTL 5).

PTL 1: Japanese Patent No. 3508742
PTL 2: Japanese Patent No. 4787736
PTL 3: Japanese Patent No. 3242223
PTL 4: JP-A-2005-247574
PTL 5: Japanese Patent No. 4835959
NPL 1: Karikomi et al., Highly Responsive Acceleration Control for Newly Developed EV, Society of Automotive Engineers of Japan, Annual Conference Proceedings No. 55-11

DISCLOSURE OF INVENTION

Technical Problem

The motor controller for the electric vehicle as disclosed in PTL 1 has a problem that control calculation or control adjustment is complicated since a control system employs multiple transfer function models and vehicle parameters. In addition, a signal of the vibration frequency is extracted by causing the band-pass filter H(s) to be substantially coincident with a resonance frequency, of a drive system. Consequently, when the vibrations are suppressed by feeding back the signal, if a center frequency is deviated, there is a problem of a degraded vibration suppression effect. In addition, it is necessary to widen a pass-band width of the filter for a disturbance factor in which the vibration frequency varies depending on a motor rotation speed such as the torque ripples of the motor. However, since the control system becomes unstable, there is a problem of an insufficient vibration suppression effect.

The motor controller for the electric vehicle as disclosed in PTL 2 performs a speed damping control by frequency-analyzing a signal obtained from a motor rotation speed detector so as to allow the signal to pass through a major component of the detected frequency. However, in the torque ripples of the motor, the vibration frequency varies depending on the rotation speed of the motor shaft. Consequently, in the electric vehicle in which the motor rotation speed greatly varies from a vehicle stop state to a fast driving state, and further, which repeatedly performs acceleration and deceleration, a method which determines a filter frequency after performing the frequency analysis such as the fast Fourier transform (FFT) is not practical. For example, when the frequency analysis is performed by means of FFT at a frequency resolution of 0.1 seconds, it is necessary to acquire data of several tens of seconds in a state where the vibration frequency is constant. However, since the motor rotation speed greatly varies within a few seconds during the acceleration and the deceleration of the vehicle, there is also a problem in that accuracy of the frequency analysis result using FFT is significantly degraded.

The motor controller for the electric vehicle as disclosed in PTL 3 reduces the torque ripples by using the amplitude and the phase of the torque ripples which are set in advance and associated with each torque command, speed information, rotation position of the motor. However, in the electric vehicle, position detection accuracy is unlikely to be guaranteed in satisfying high accuracy required for a detector which detects the rotation position for each motor. If there is a position detection error in a position detector, there is a problem that an effect of reducing the torque ripples is significantly degraded.

The motor controller for the electric vehicle as disclosed in PTL 4 prepares a dedicated operation mode, measures the motor torque ripples in the operation mode by using a torque ripple measurement calculator, and creates a data table based on the amplitude and the phase of the obtained torque ripples. However, in the electric vehicle, in a viewpoint of equipment, cost, and time, it is not practical to extract the amplitude and the phase of the torque ripples by applying a load to the motor for each vehicle. In addition, when the motor is replaced due to a failure, if the amplitude and the phase of the torque ripples which are obtained before the replacement are used, a problem similar to that in PTL 3 occurs.

The motor controller for the electric vehicle as disclosed in PTL 5 has the positive/negative determination unit which determines the positive or negative output torque of the motor in order to solve the problem that the torque ripples having different characteristics between the positive torque and the negative torque are generated due to the variations in the characteristics of the mount rubber of the support unit for supporting the motor in the vehicle body, or the structure of the drive transmission system from the rotary electric machine to the wheels. The motor controller generates the ripple correction wave having the different phase corresponding to the positive or negative output torque, and performs the proper ripple correction corresponding to the generated torque ripples. However, it is necessary to install dedicated equipment in order to acquire the torque ripple characteristics caused by the variations in the characteristics of the mount rubber of the support unit for supporting the motor in the vehicle body, or the structure of the drive transmission system from the motor to the wheels. Consequently, there is a problem that a great cost and a considerable time are required. In addition, when the motor is replaced due to a failure, if the amplitude and the phase of the torque ripples which are obtained before the replacement are used, there occurs a problem similar to that in PTL 3.

The present invention is made in order to solve the above-described problems, and an object thereof is to provide a motor controller for an electric vehicle which can easily, inexpensively, and effectively suppress motor shaft vibrations and vehicle resonance vibrations which are caused by torque ripples.

Technical Solution

According to an aspect of the present invention, a motor controller for an electric vehicle which uses a motor as a drive source includes motor torque setting means for generating a first torque command, based on vehicle information including an accelerator opening degree and a vehicle speed of the electric vehicle, rotation position detection means for detecting a rotation position of the motor, rotation speed calculation means for calculating a rotation speed from a rotation position signal, a high-pass filter that extracts an AC signal component of a rotation speed signal, and a resonance suppression gain circuit that outputs a resonance suppression signal, based on an AC signal extracted by the high-pass filter. A signal in which the resonance suppression signal is added to or subtracted from the first torque command is used as a second torque command so as to perform a drive control for the motor.

Advantageous Effects of Invention

In the motor controller of the electric vehicle according to an aspect of the present invention, the current control means of the motor performs a process by following the second command in which the resonance suppression signal extracted from the high-pass filter is added to or subtracted from the first torque command based on the vehicle information such as the accelerator opening degree and the vehicle speed of the electric vehicle. In this manner, even in the electric vehicle equipped with the motor having large torque ripples such as an embedded magnet-type permanent magnet motor, a rare earth-less motor, and an energy saving rare earth motor, it is possible to sufficiently reduce motor shaft vibrations and vehicle vibrations.

DESCRIPTION OF EMBODIMENTS

Embodiment 1

Figure 1:
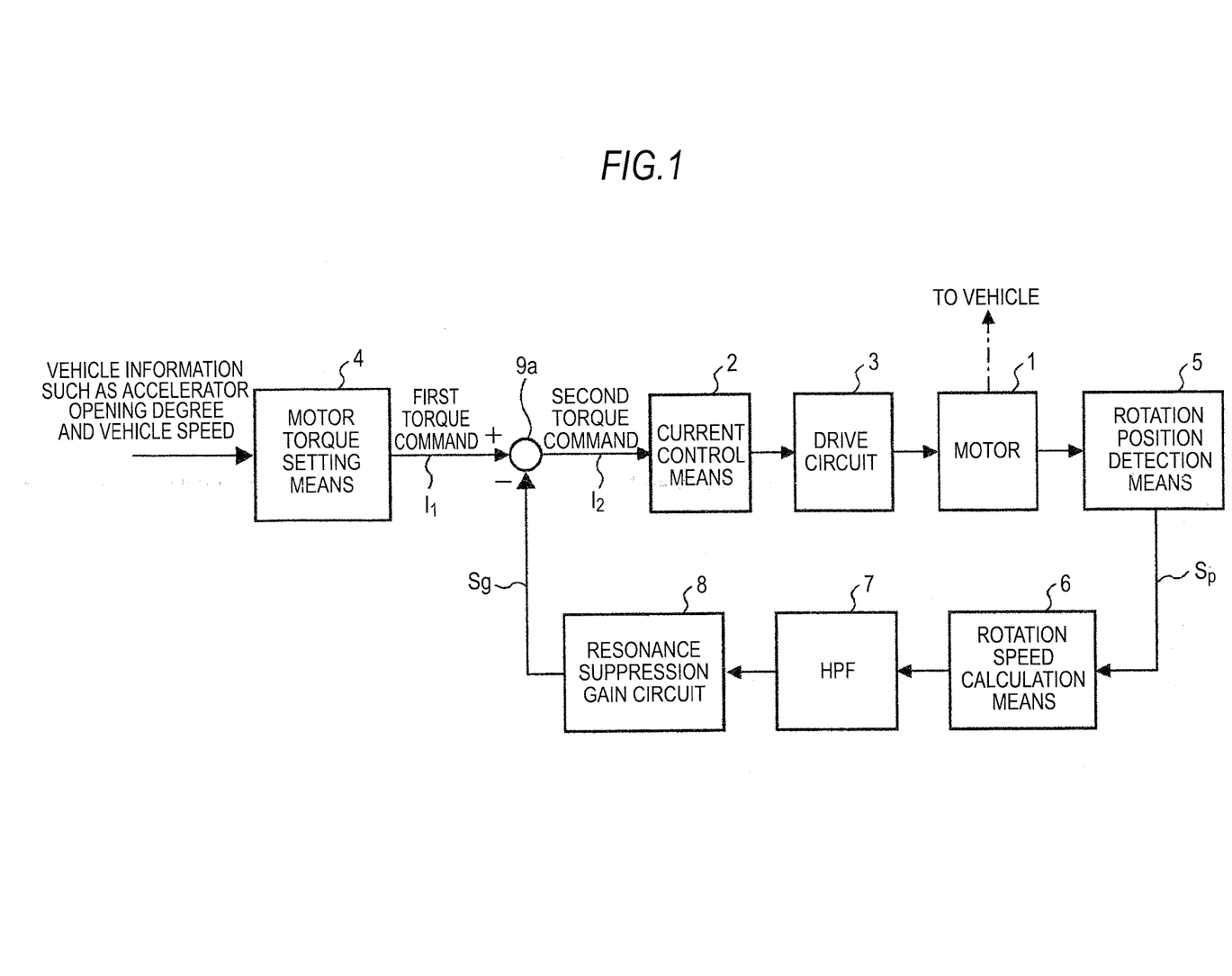
FIG. 1 is a block diagram illustrating a basic configuration of a motor controller for an electric vehicle according to Embodiment 1 of the present invention.

FIG. 1 is a block diagram illustrating a basic configuration of a motor controller for an electric vehicle according to Embodiment 1 of the present invention. Although detailed description of the electric vehicle itself will be omitted herein, the electric vehicle may have a previously known configuration, and for example, may refer to the configuration described in PTL 1 described above.

In FIG. 1, a motor 1 is a drive source which is connected to a vehicle via a drive system of a gear or a drive shaft (not illustrated) and transmits a drive force to the vehicle. The drive force generated in the motor 1 is provided via current control means 2 and a drive circuit 3, based on a second torque command I2. Motor torque setting means 4 outputs a first torque command I1 which is associated with a map, a conditional expression, and a mathematical expression which are set in advance, corresponding to information such as an accelerator opening degree and a vehicle speed.

The second torque command I2 is obtained by adding the first torque command I1 to or subtracting from the resonance suppression signal Sg generated by the resonance suppression gain circuit 8, based on vehicle information such as the accelerator opening degree and the vehicle speed of the electric vehicle. Rotation speed calculation means 6 calculates a rotation speed from the rotation position detected by the rotation position detection means 5. Furthermore, a high-pass filter 7 extracts an AC signal component of the rotation speed detected by the rotation speed calculation means 6. A resonance suppression gain circuit 8 generates a resonance suppression signal Sg from the AC signal component extracted by the high-pass filter 7. An adder/subtractor 9 adds or subtracts the resonance suppression signal Sg to or from the first torque command I1. In this case, the second torque command I2 is obtained by subtracting.

Figure 2:
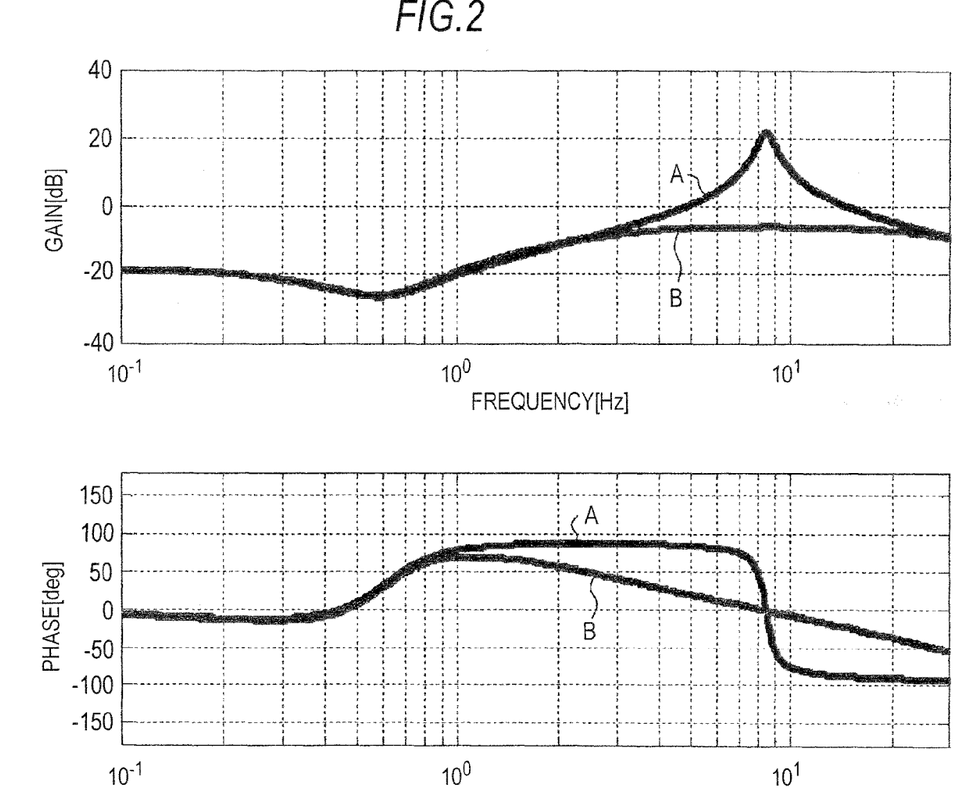
FIG. 2 is a Bode diagram illustrating a control effect in Embodiment 1 of the present invention.

FIG. 2 is a view illustrating an effect of reducing vibrations when the high-pass filter 7 and the resonance suppression gain circuit 8 perform a vibration suppression control in the above-described motor controller for the electric vehicle in FIG. 1. In the drawing, a letter A represents gain and phase characteristics when the second torque command I2 is caused to be equal to the first torque command I1, that is, when the second torque command in which the resonance suppression signal is added to or subtracted from the first torque command is multiplied by a coefficient so that a steady-state error becomes zero between the first torque command and the second torque command. A letter B represents characteristics of a gain (dB) and a phase (deg) when a proportional gain G is applied to an output of the high-pass filter 7 (in this case, a secondary high-pass filter is used) and the proportional gain G is increased within a stably controllable range. It is understood that a simple configuration of only applying the proportional gain G to the output of the secondary high-pass filter 7 can sufficiently reduce only gain peaks in the resonance frequency (approximately 10 Hz) of the electric vehicle.

Embodiment 2

Figure 3:
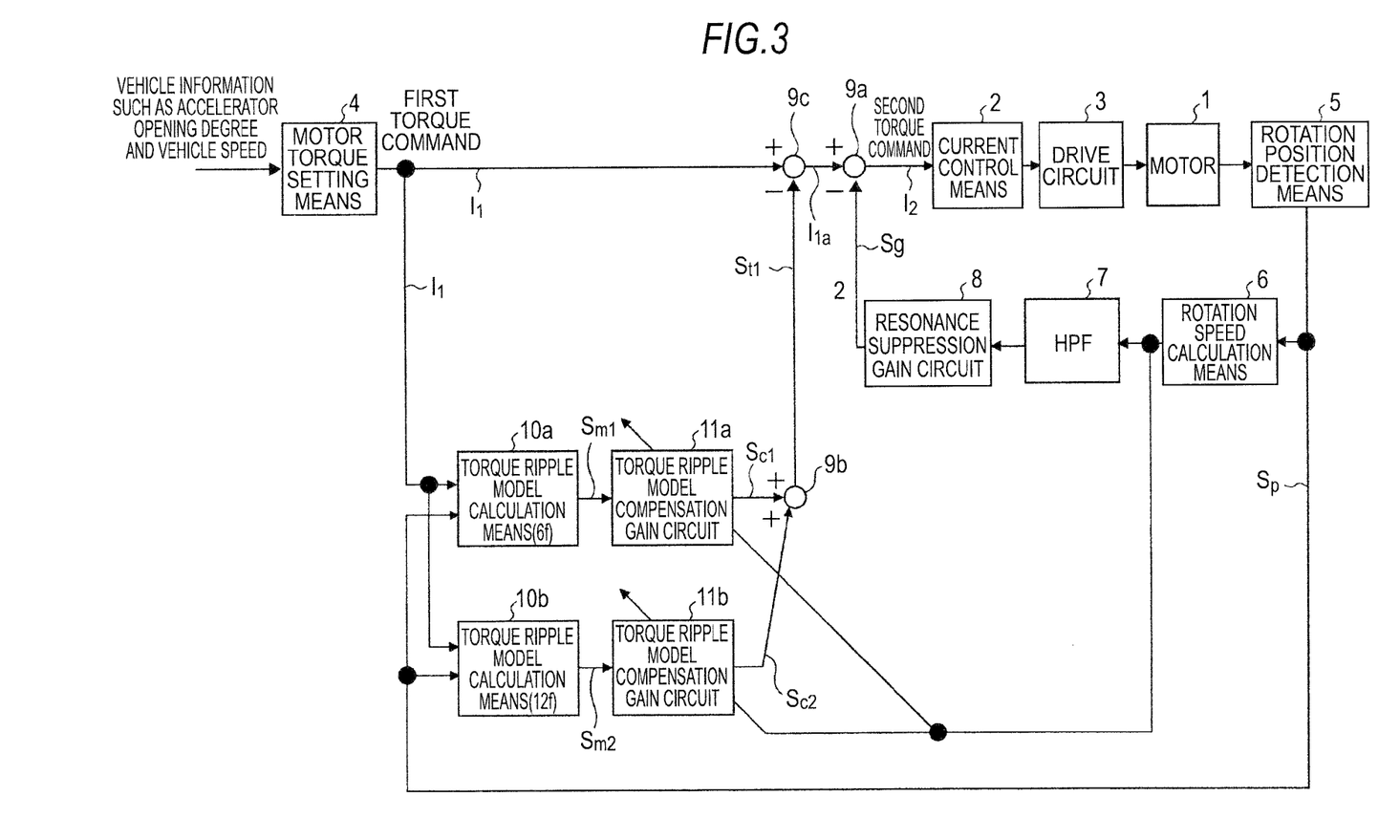
FIG. 3 is a block diagram illustrating a configuration of a motor controller for an electric vehicle according to Embodiment 2 of the present invention.

FIG. 3 is a block diagram illustrating a modification example of a motor controller for an electric vehicle according to Embodiment 2 of the present invention. The modification example is different from Embodiment 1 in that there are newly provided torque ripple model calculation means 10a and 10b for outputting torque ripple model signals Sm1 and Sm2 from the first torque command I1 and a rotation position signal Sp, and torque ripple model compensation gain circuits 11a and 11b for outputting torque ripple model compensation signals Sc1 and Sc2, based on the torque ripple model signals Sm1 and Sm2.

The torque ripple model calculation means 10a and 10b calculate the torque ripples of the motor from a model expression, based on the first torque command I1 and the rotation position signal Sp input from the rotation position detection means 5. In the present embodiment, a value of the torque ripples is calculated by using the following expression in which the torque ripples of the motor are digitalized by superimposing sine waves.

[Math. 1]

$$T_{ripple\_model} = \sum_{n=6,12,18} T_n \sin(n\theta + \alpha_n) \quad \text{Expression (1)}$$

Here, signs represent the following.
$T_{ripple\_model}$: compensation torque using torque ripple model
n: torque ripple order number
$T_n$: $n^{th}$ torque ripple amplitude
$\alpha_n$: $n^{th}$ torque ripple phase difference
$\theta$: rotation position (electrical angle)

A determination method of a torque ripple order number n according to the present embodiment is expressed as follows. An output value of a torque ripple model when there is a rotation position error $\Delta\theta$ is obtained by the following expression.

[Math. 2]

$$T_{ripple\_model} = \sum_{n=6,12,18} T_n \sin(n(\theta + \Delta\theta) + \alpha_n) \quad \text{Expression (2)}$$

When a true value of the torque ripples is expressed by Expression (1), a torque ripple compensation error when there is the rotation position error $\Delta\theta$ is obtained by the following expression.

[Math. 3]

$$\Delta T_{ripple} = \sum_{n=6,12,18} T_n \sin(n\theta + \alpha_n) - \quad \text{Expression (3)}$$
$$\sum_{n=6,12,18} T_n \sin(n(\theta + \Delta\theta) + \alpha_n)$$
$$= \sum_{n=6,12,18} T_n \sqrt{2} \sqrt{1 - \cos n\Delta\theta} \sin(n\theta + \alpha_n - \gamma)$$

Here, the following expression is obtained.

$\gamma = \sin n\Delta\theta$

The torque ripple compensation error is proportional to an amplitude value of the torque ripples themselves, and a ratio of the torque ripple compensation error to the torque ripple amplitude in each order number is obtained by the following expression.

[Math. 4]

$$\frac{\Delta T_n}{T_n} = \sqrt{2}\sqrt{1 - \cos n\Delta\theta} \quad \text{Expression (4)}$$

Expression (5) enables a torque ripple value after torque ripple compensation to be smaller than a torque ripple value before the torque ripple compensation in a case where a ratio $\Delta T_n/T_n$ of the torque ripple compensation error to the torque ripple amplitude is the order number n of 1 or less.

[Math. 5]

$$\frac{\Delta T_n}{T_n} = \sqrt{2}\sqrt{1 - \cos n\Delta\theta} \leq 1 \quad \text{Expression (5)}$$

In this torque ripple model calculation means 10a and 10b, the maximum order number n of the torque ripple model used in calculating the torque ripple model signals Sm1 and Sm2 is set to be smaller than a value calculated by 60 degrees/rotation position error (electrical angle).

[Math. 6]

$$\cos n\Delta\theta \geq \cos 60 deg \quad \text{Expression (6)}$$
$$n \leq \frac{60 deg}{\Delta\theta}$$

Figure 4:
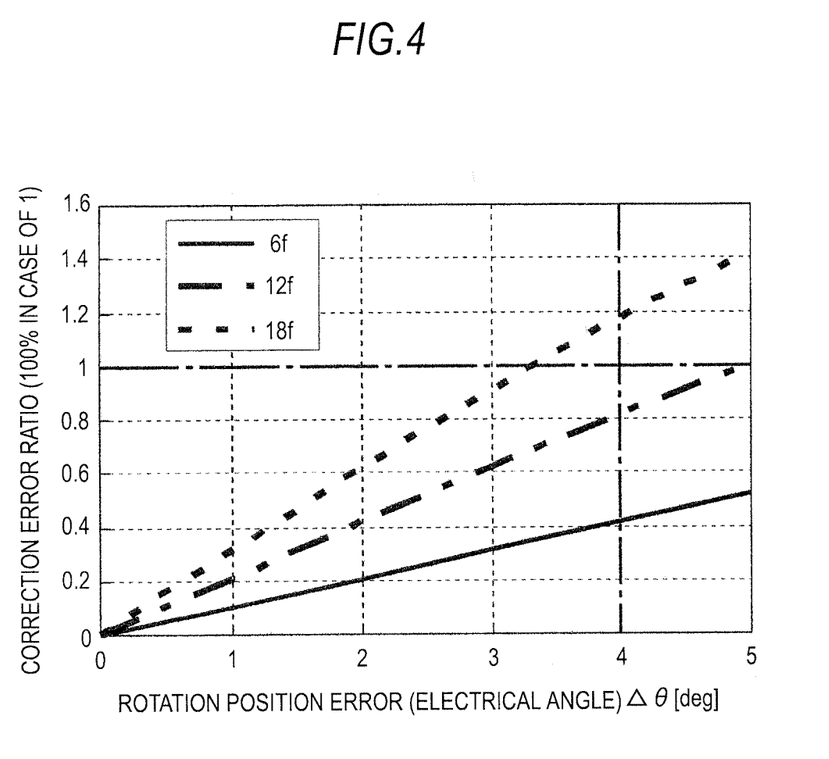
FIG. 4 is a view illustrating a relationship between a position detection error and a torque ripple compensation error in Embodiment 2 of the present invention.

The order number of the significant torque ripples illustrated in the present embodiment shows the $6^{th}$, $12^{th}$, and 18th torque ripples, when the electrical angle of the motor is used as a fundamental frequency. With regard to the 6th, 12th, and 18th torque ripples, FIG. 4 illustrates a result in which a ratio of a correction error with respect to the rotation position error Δθ is calculated by using Expression (4). If it is expected that the worst value of the rotation position error including an attachment error of the rotation position detection means 5 is 4 degrees in the electrical angle (in a motor of the pole logarithm of 4, 4 degrees in the electrical angle is equivalent to 1 degree in a mechanical angle), the correction error shows 1 or less in the 6th and 12th torque ripples. The 6th and 12th torque ripples are modeled so as to generate the torque ripple model compensation signals Sc1 and Sc2. In this manner, it is possible to enhance the effect of reducing torque ripple vibrations of the motor. In FIG. 3, the torque ripple model calculation means 10a is used for the 6th (6 f) torque ripple, and the torque ripple model calculation means 10b is used for the 12th (12 f) torque ripple.

In the motor controller for the actual electric vehicle, as is disclosed in PTL 5, due to a frictional change in a motor drive system or the vehicle resonance influence, it is difficult to obtain the torque compensation value by measuring and inversely calculating the torque compensation value in accordance with each vehicle, in view of different characteristics between the positive torque and the negative torque which are generated due to the variations in the characteristics of the mount rubber of the support unit for supporting the motor in the vehicle body, or the structure of the drive transmission system from the rotary electric machine to the wheels. For example, in the present embodiment, the motor mounted on the vehicle is connected to a torque meter and a low-speed pulsation motor whose speed is controlled, and the torque ripples generated by the motor mounted on the vehicle is measured by the torque meter when the motors are rotated at a constant speed. Then, the amplitude and the phase in each order number of the torque ripples are extracted based on the measurement data. Similar to the methods disclosed in PTL 3 and PTL 4, the amplitude and the phase are modeled as the amplitude map and the phase map of the torque ripples, in the torque ripple model calculation means 10a and 10b.

In this manner, the torque ripples are measured by using a motor having no connection with vehicle characteristics, a torque meter, and a low-speed pulsation motor controlled to maintain a constant speed, so as not to depend on the variations in the characteristics of the mount rubber of the support unit for supporting the motor in the vehicle body, or the structure of the drive transmission system from the rotary electric machine to the wheels. Then, a map is generated from the amplitude and the phase of the measured torque ripples. Accordingly, it is possible to determine the amplitude and the phase of the torque ripples without paying attention to the variations in the characteristics of the vehicle.

Figure 5A:
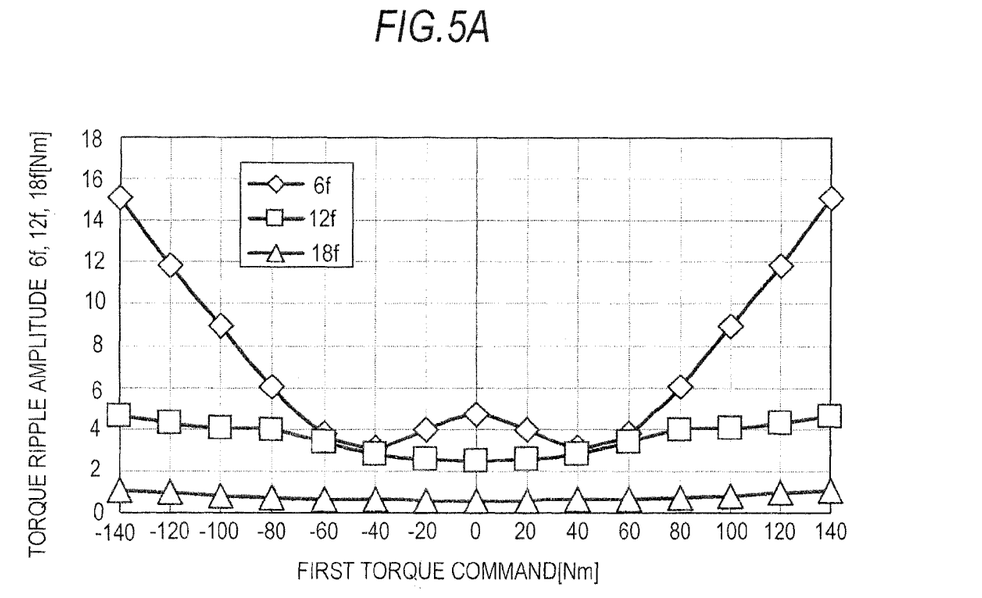
FIG. 5 is a view illustrating an example of an amplitude map and a phase map of torque ripples in Embodiment 2 of the present invention.
Figure 5B:
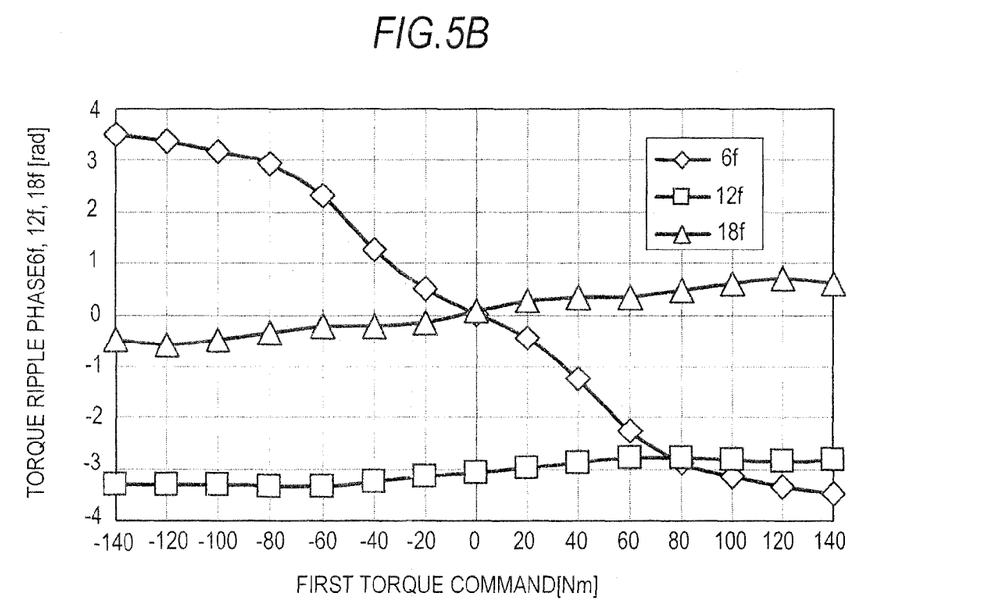

FIGS. 5A and 5B respectively illustrate an example of the amplitude map and the phase map of the torque ripples according to the present embodiment. The amplitude map and the phase map of the torque ripples are not necessarily obtained from the above-described torque meter. As long as a certain degree of accuracy can be obtained, the amplitude map and the phase map of the torque ripples may be obtained from the numerical calculation such as the magnetic field analysis. In this manner, by using the amplitude map and the phase map of the torque ripples obtained from the numerical calculation such as the magnetic field analysis, it is possible to eliminate the time and effort required for the measurement of the torque ripples which are essential in order to obtain the amplitude and the phase of the torque ripples in the related art.

Next, the torque ripple model compensation gain circuits 11a and 11b multiply the torque ripple model compensation signals Sc1 and Sc2, thereby calculating the torque ripple compensation signal. The torque ripple model compensation gain circuits 11a and 11b may be configured to be constant with respect to the rotation speed of the motor, or to be variable in response to the motor rotation speed.

As described above, a resonance suppression signal Sg generated from the rotation speed calculation means 6, the high-pass filter 7, and the resonance suppression gain circuit 8 is further added to or subtracted from a signal I1a in which a signal St1 obtained by adding or subtracting the torque ripple model compensation signals Sc1 and Sc2 is added to or subtracted from the first torque command I1. In this manner, it is possible to significantly reduce the influence of the vibrations generated due to the variations in the characteristics of the mount rubber of the support unit for supporting the motor in the vehicle body, or the structure of the drive transmission system from the rotary electric machine to the wheels.

Embodiment 3

Figure 6:
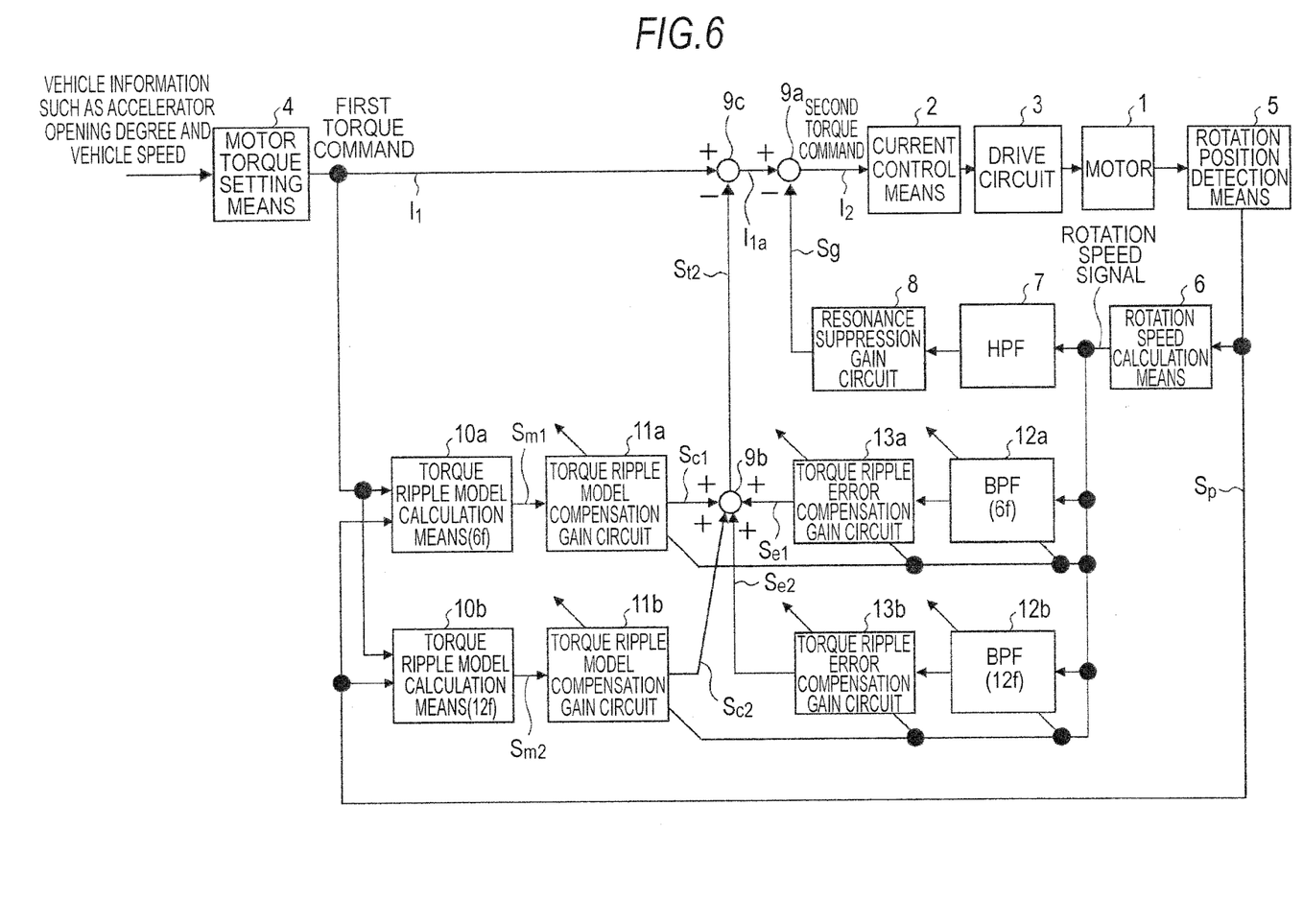
FIG. 6 is a block diagram illustrating a configuration of a motor controller for an electric vehicle according to Embodiment 3 of the present invention.

FIG. 6 is a block diagram illustrating a modification example of a motor controller for an electric vehicle according to Embodiment 3 of the present invention. The modification example is different from Embodiment 2 in that there are newly provided band-pass filters 12a and 12b which input the rotation speed signal from the rotation speed calculation means 6 and whose center frequency is a frequency of main torque ripples determined in advance by the structure of the motor 1, the current control means 2, and the drive circuit 3, and torque ripple error compensation gain circuits 13a and 13b which output torque ripple error compensation signals Se1 and Se2, based on the torque ripple frequency signal extracted from the band-pass filters 12a and 12b. The torque ripple model compensation signals Sc1 and Sc2 are added to the torque ripple error compensation signals Se1 and Se2 by an adder 9b. An output St2 thereof is subtracted from the first torque command I1 by a subtractor 9c so as to obtain the signal I1a. This signal I1a is added to or subtracted from the resonance suppression signal Sg, thereby obtaining the second torque command I2.

For example, the band-pass filters 12a and 12b serve as a filter which inputs the rotation speed signal and through which the torque ripple frequency is caused to pass. The band-pass filters 12a and 12b have a configuration according to the following expression.

[Math. 7]

$$\frac{2\zeta\omega_{nf}s}{s^2 + 2\zeta\omega_{nf}s + \omega_{nf}^2} \quad \text{Expression (7)}$$

Here, ωnf represents the torque ripple frequency obtained by using the rotation speed signal. For example, in a case of the 6th torque ripple, if the rotation speed signal is set to a and the pole logarithm of the motor is set to p, the result is expressed by ω6 f=6×m×p. The damping constant ζ may be determined in a range of approximately 0.05 to 1. In the present embodiment, the damping constant ζ is expressed by ζ=0.2. A letter s is the Laplace operator.

Next, the torque ripple error compensation gain circuits 13a and 13b multiply the torque ripple frequency signal which is an output of the band-pass filters 12a and 12b, thereby calculating the torque ripple error compensation signals Se1 and Se2. The torque ripple error compensation gain circuits 13a and 13b are variable in response to the motor rotation speed, and a size thereof is set so that the control system has a great value in a stable range. In this manner, it is possible to enhance the effect of reducing the torque ripple vibrations of the motor.

The high-pass filter 7 has a configuration of the following primary high-pass filter or secondary high-pass filter. A cutoff frequency ωHPF of the high-pass filter 7 is set to have a value so that overshooting or a residual vibration is minimized with respect to the stepwise first torque command I1. In the secondary high-pass filter, the cutoff frequency is set to 1 Hz or less, and in the primary high-pass filter, the cutoff frequency is set to approximately 2 Hz. A molecular coefficient Kcmp of the primary high-pass filter is a coefficient for correcting the steady-state error of a torque response.

Next, the steady-state error occurring when the primary high-pass filter is used will be described. A case will be described in which a transfer function Gp(s) from the torque command I2 in FIG. 1 to a differential value (output of the rotation speed calculation means 6 in FIG. 1) of the rotation position signal Sp is obtained by the following expression which is described by Expression (1) in NPL 1.

[Math. 8]

$$\frac{1}{s} \frac{b_2 s^2 + b_1 s + b_0}{s^2 + 2\zeta_p \omega_p s + \omega_p^2} \quad \text{Expression (8)}$$

Here, letters and symbols b0, b1, b2, $\zeta_p$, and ωp are values determined according to characteristics of an actual vehicle, and the letter s is the Laplace operator.

If an amplification factor of the resonance suppression gain circuit 8 is set to kv and the high-pass filter 7 is set to the primary high-pass filter, the transfer function from the output of the rotation speed calculation means 6 in FIG. 1 to the resonance suppression signal Sq is expressed by the following expression.

[Math. 9]

$$k_v \frac{s}{s + \omega_{HPF}} \quad \text{Expression (9)}$$

The steady-state error with respect to the torque command when the torque command is changed stepwise from 0 to Tconst is obtained by the following expression.

[Math. 10]

$$T_{const} - \lim_{s \to 0} \frac{T_{const}}{1 + k_v \frac{s}{s + \omega_{HPF}} \frac{1}{s} \frac{b_2 s^2 + b_1 s + b_0}{s^2 + 2\zeta_p \omega_p s + \omega_p^2}} = \quad \text{Expression (10)}$$

$$T_{const}\left(1 - \frac{1}{1 + \frac{k_v b_0}{\omega_{HPF} \omega_p^2}}\right).$$

It is understood from the above expression that the steady-state error occurs at a constant rate with respect to the torque command when the primary high-pass filter is used. The coefficient Kcmp may be calculated by using Expression (10) if each value of Expression (10) is known. However, if the steady-state torque of the stepwise first torque command and the torque response of the motor can be measured, the coefficient Kcmp may be set so that both of these are substantially coincident with each other.

If the secondary high-pass filter is used, the steady-state error of the torque response is zero, and the above-described correction coefficient is not required. A damping constant $\zeta$HPF of the secondary high-pass filter may be set to approximately 0.6 to 1.0.

[Math. 11]

$$\text{Primary high-pass filter:} \frac{k_{cmp} s}{s + \omega_{HPF}} \quad \text{Expression (11)}$$

[Math. 12]

$$\text{Secondary high-pass filter:} \frac{s^2}{s^2 + 2\zeta_{HPF} \omega_{HPF} s + \omega_{HPF}^2} \quad \text{Expression (12)}$$

Next, the resonance suppression gain circuit 8 has a gain (dB) which is an input-output ratio, and is configured to output the resonance suppression signal by multiplying the AC signal from the high-pass filter 7.

In the generation of the resonance suppression signal, the vibrations can be reduced by using either the primary high-pass filter or the secondary high-pass filter.

As described above, the resonance suppression signal Sg generated from the rotation speed calculation means 6, the high-pass filter 7, and the resonance suppression gain circuit 8 is further added to or subtracted from the signal I1a in which the signal St2 obtained by adding or subtracting the torque ripple model compensation signals Sc1 and Sc2 and the torque ripple error compensation signals Se1 and Se2 is added to or subtracted from the first torque command I1. In this manner, it is possible to significantly reduce the influence of the vibrations generated due to the variations in the characteristics of the mount rubber of the support unit for supporting the motor in the vehicle body, or the structure of the drive transmission system from the rotary electric machine to the wheels.

Figure 7A:
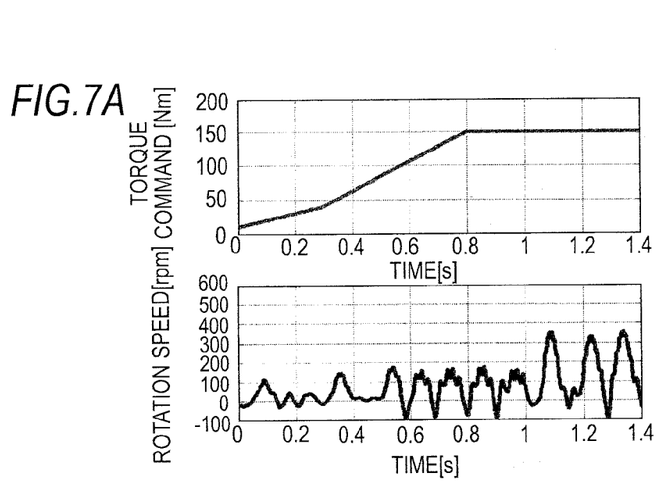
FIG. 7 is a view illustrating waveform data for indicating a vibration suppression effect in Embodiment 1 to Embodiment 3 of the present invention.

FIGS. 7A-7D are views illustrating a waveform in which the first and second torque commands (top) and the rotation speed signal (bottom) of the motor are actually measured when an accelerator is fully opened with a gradient of 10% by using the control system described in Embodiment 1 to Embodiment 3. FIG. 7A illustrates a waveform when the first torque command is equal to the second torque command in the control configuration of Embodiment 1 (refer to FIG. 1).

Figure 7B:
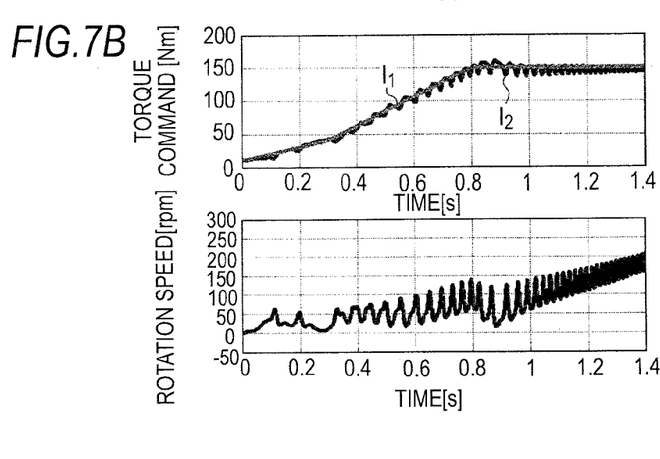
Figure 7C:
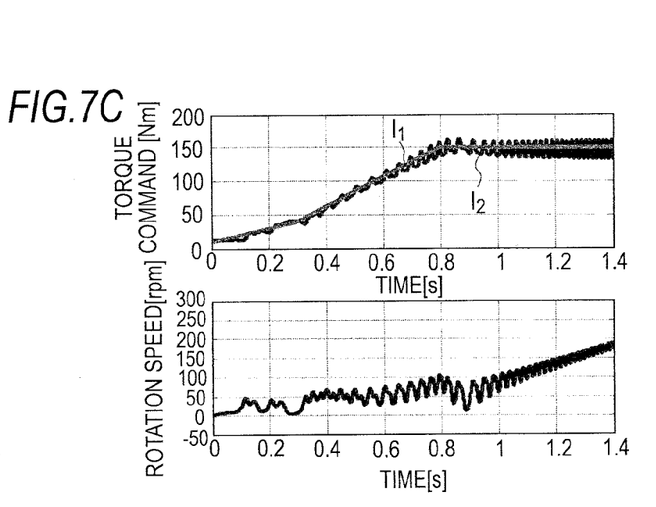
Figure 7D:
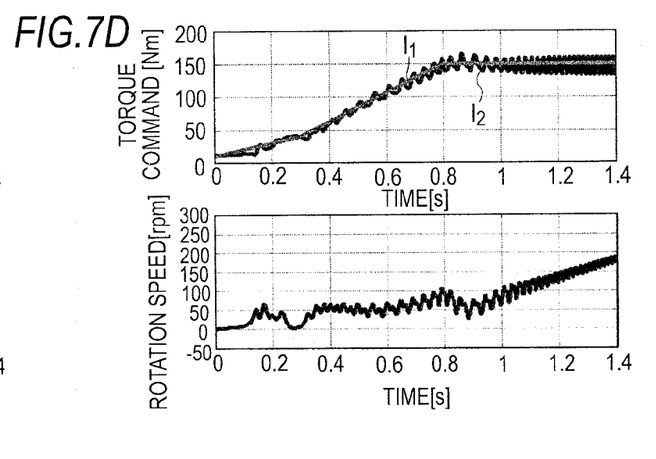

FIG. 7B illustrates a waveform when the resonance suppression signal is used in the control configuration of Embodiment 1 (refer to FIG. 1). In the drawing, a loosely folded line represents the first torque command I1, and a vibration waveform represents the second torque command I2. As compared to a case in FIG. 7A the vibrations of the rotation speed signal which are caused by the torque ripples of the motor are significantly reduced. FIG. 7C illustrates a waveform when the position detection error is set to 4 degrees in the electrical angle in the control configuration of Embodiment 2 (refer to FIG. 3), and the vibrations of the rotation speed signal can be reduced as compared to a case in FIG. 7B. FIG. 7D illustrates a waveform when the position detection error is set to 4 degrees in the electrical angle in the control configuration of Embodiment 3 (refer to FIG. 6). It is understood that the vibrations of the rotation speed signal can be further reduced as compared to a case in FIG. 7C.

As described above, when the position detection error of the motor is small to some extent, or when the position detection error of the motor can be reduced by a learning operation or individual adjustment of the motor, the control configuration according to any one of the embodiments of the present invention may be adopted. Accordingly, even in the electric vehicle equipped with the motor having large torque ripples such as an embedded magnet-type permanent magnet motor, a rare earth-less motor, and an energy saving rare earth motor, it is possible to significantly reduce the motor shaft vibrations and the vehicle vibrations, as compared to that in the related art.

REFERENCE SIGNS LIST 1 motor
2 current control means
3 drive circuit
4 motor torque setting means
5 rotation position detection means
6 rotation speed calculation means
7 high-pass filter
8 resonance suppression gain circuit
9a, 9b, 9c adder/subtracter
10a, 10b torque ripple model calculation circuit
11a, 11b torque ripple compensation gain circuit
12a, 12b band-pass filter
13a, 13b torque ripple error compensation gain circuit

The invention claimed is:

1. A motor controller for an electric vehicle which uses a motor as a drive source, the motor controller comprising:
motor torque setting means for generating a first torque command, based on vehicle information including an accelerator opening degree and a vehicle speed of the electric vehicle;
rotation position detection means for detecting a rotation position of the motor and outputting a rotation position signal;
rotation speed calculation means for calculating a rotation speed, from the rotation position signal, and outputting a rotation speed signal;
a high-pass filter that extracts an AC signal component of the rotation speed signal;
a resonance suppression gain circuit that outputs a resonance suppression signal, based on the AC signal component;
torque ripple model calculation means for outputting a torque ripple model signal calculated based on the first torque command and the rotation position signal; and
a torque ripple model compensation gain circuit that outputs a torque ripple model compensation signal calculated based on the torque ripple model signal,
wherein a signal in which the torque ripple model compensation signal and the resonance suppression signal are added to or subtracted from the first torque command is used as a second torque command to perform a drive control for the motor.

2. The motor controller for an electric vehicle according to claim 1, wherein the high-pass filter that extracts the AC signal component of the rotation speed serves as a primary high-pass filter having a first cut-off frequency or a secondary high-pass filter having a second cut-off frequency.

3. The motor controller for an electric vehicle according to claim 2, wherein in the high-pass filter in which the high-pass filter that extracts the AC signal component of the rotation speed serves as the primary high-pass filter, the second torque command in which the resonance suppression signal is added to or subtracted from the first torque command is multiplied by a coefficient so that a steady-state error becomes zero between the first torque command and the second torque command.

4. The motor controller for an electric vehicle according to claim 2, wherein in the high-pass filter in which the high-pass filter that extracts the AC signal component of the rotation speed serves as the secondary high-pass filter, a proportional gain G is applied to an output of the high-pass filter.

5. The motor controller for an electric vehicle according to claim 1, wherein the torque ripple model calculation means calculates the torque ripple model signal by setting the maximum order number n of a torque ripple model, which is used in calculating the torque ripple model signal, to be smaller than or equal to a value calculated by dividing 60 degrees by a position detection error.

6. The motor controller for an electric vehicle according to claim 1, wherein the torque ripple model calculation means calculates the torque ripple model signal by setting amplitude and a phase of the torque ripples based on a magnetic field analysis of the motor or a prior measurement result of a representative motor to an amplitude map and a phase map of the torque ripple model used in calculating the torque ripple model signal.

7. The motor controller for an electric vehicle according to claim 1, wherein the torque ripple model calculation means calculates the torque ripple model signal by measuring the torque ripples using a motor having no connection with vehicle characteristics, a torque meter, and a low-speed pulsation motor controlled to maintain a constant speed, and
wherein a map is created, based on the amplitude and the phase of the measured torque ripples.

8. The motor controller for an electric vehicle according to claim 1, wherein a size of the torque ripple model compensation gain circuit can be changed depending on the rotation speed.

9. The motor controller for an electric vehicle according to claim 1, further comprising:
a band-pass filter whose center frequency is a frequency of the torque ripples which is determined in advance by a motor structure and an inverter driving method; and
a torque ripple error compensation gain circuit that outputs a torque ripple error compensation signal, based on a torque ripple frequency signal extracted from the band-pass filter,
wherein a signal in which the torque ripple model compensation signal, the torque ripple error compensation signal and the resonance suppression signal are added to or subtracted from the first torque command is used as the second torque command to perform the drive control for the motor.

10. The motor controller for an electric vehicle according to claim 9, wherein a setting value of the damping constant in the band-pass filter is set from approximately 0.05 to approximately 1.

11. The motor controller for an electric vehicle according to claim 9, wherein a size of the torque ripple error compensation gain circuit can be changed depending on the rotation speed.

* * * * *